(12) United States Patent
Colby et al.

(10) Patent No.: US 8,784,588 B2
(45) Date of Patent: Jul. 22, 2014

(54) DAMAGED REINFORCEMENT ENDING PREPARATION FOR TIRE REPAIRS

(75) Inventors: E. Bruce Colby, Greenville, SC (US); Nathan J. Panning, Simpsonville, SC (US); Cesar Zarak, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 126 days.

(21) Appl. No.: 13/001,411

(22) PCT Filed: Jun. 27, 2008

(86) PCT No.: PCT/US2008/068597
§ 371 (c)(1),
(2), (4) Date: Dec. 24, 2010

(87) PCT Pub. No.: WO2009/157947
PCT Pub. Date: Dec. 30, 2009

(65) Prior Publication Data
US 2011/0174427 A1   Jul. 21, 2011

(51) Int. Cl.
*B29C 73/04* (2006.01)
(52) U.S. Cl.
USPC .............................. 156/95; 156/97; 152/367
(58) Field of Classification Search
USPC ............. 156/95, 97, 98, 304.5; 152/367, 371, 152/532, 538, 552, 554, 558
See application file for complete search history.

(56) References Cited

U.S. PATENT DOCUMENTS

| 1,591,817 | A | * | 7/1926 | Hawkinson | 156/97 |
| 2,229,878 | A | * | 1/1941 | Wilson | 152/370 |
| 2,547,487 | A | | 4/1951 | Houghton | |
| 2,585,635 | A | | 2/1952 | Dibble | |
| 2,596,179 | A | | 5/1952 | Seymour | |
| 2,638,955 | A | | 5/1953 | Gruber | |
| 2,833,327 | A | | 5/1958 | Boyce | |

(Continued)

FOREIGN PATENT DOCUMENTS

| CA | 1335560 | 5/1995 |
| CA | 2354284 | 1/2003 |

(Continued)

OTHER PUBLICATIONS

Machine-generated English language translation of FR 1226595 (original document dated 1960).*

(Continued)

*Primary Examiner* — Martin Rogers
(74) *Attorney, Agent, or Firm* — Hahn Loeser & Parks, LLP

(57) ABSTRACT

The present inventions includes methods and apparatus for preparing a portion of a tire for repair, the methods having steps that include forming an edge along an opening within the tire, the edge extending between an interior and an exterior surface of the tire and including one or more tire reinforcement endings, the edge being formed to include an alternating arrangement of tire reinforcement endings. Particular embodiments of the present invention includes methods of preparing a portion of a tire for repair, the method having steps that include forming an edge within an opening of a tire, said edge extending between an interior and exterior tire surface and including one or more reinforcement endings of the tire; and, applying a wrap about the edge to substantially cover the one or more tire reinforcement endings.

16 Claims, 7 Drawing Sheets

(56) References Cited

U.S. PATENT DOCUMENTS

| | | | |
|---|---|---|---|
| 3,004,580 A | 10/1961 | Chambers et al. | |
| 3,080,907 A | 3/1963 | Barrett | |
| 3,095,342 A | 6/1963 | Kraly | |
| 3,133,586 A | 5/1964 | Wolfe | |
| 3,133,587 A | 5/1964 | Wolfe | |
| 3,143,156 A * | 8/1964 | Murphy et al. | 152/370 |
| 3,160,194 A | 12/1964 | Barrett | |
| 3,190,338 A * | 6/1965 | Wolfe | 152/370 |
| 3,267,981 A | 8/1966 | Bennies | |
| 3,282,319 A | 11/1966 | Barnett | |
| 3,299,936 A | 1/1967 | Van Den Berg | |
| 3,306,332 A * | 2/1967 | Williams et al. | 152/367 |
| 3,332,466 A * | 7/1967 | Wolfe | 152/367 |
| 3,448,784 A * | 6/1969 | Sons, Jr. | 152/370 |
| 3,648,750 A * | 3/1972 | Felden | 152/370 |
| 3,719,218 A | 3/1973 | Leybourne, III | |
| 3,730,247 A | 5/1973 | White | |
| 4,285,382 A | 8/1981 | DiRocco et al. | |
| 4,317,692 A | 3/1982 | Niconchuk | |
| 4,333,508 A | 6/1982 | DiRocco et al. | |
| 4,375,231 A | 3/1983 | Bubik et al. | |
| 4,385,651 A | 5/1983 | Arquilla | |
| 4,399,854 A | 8/1983 | DiRocco et al. | |
| 4,408,649 A | 10/1983 | Litterini | |
| 4,424,088 A | 1/1984 | Durif | |
| 4,434,832 A | 3/1984 | Koch et al. | |
| 4,540,035 A | 9/1985 | Roberts | |
| 4,696,332 A | 9/1987 | Koch | |
| 4,836,930 A | 6/1989 | Hill | |
| 4,923,543 A | 5/1990 | Koch | |
| 5,139,840 A | 8/1992 | Ferrara | |
| 5,247,961 A | 9/1993 | Micheau et al. | |
| 5,247,981 A * | 9/1993 | Benedicto et al. | 152/370 |
| 5,335,707 A * | 8/1994 | Sano et al. | 152/543 |
| 5,695,577 A | 12/1997 | Ferrara | |
| 5,713,842 A | 2/1998 | Kay | |
| 5,830,295 A * | 11/1998 | Hobbs et al. | 152/527 |
| 6,026,878 A | 2/2000 | Zhang et al. | |
| 6,386,255 B1 | 5/2002 | Majumdar et al. | |
| 6,426,129 B1 | 7/2002 | Kalwara et al. | |
| 6,438,932 B1 | 8/2002 | De Vos et al. | |
| 7,027,877 B2 | 4/2006 | Dupelle et al. | |
| 2006/0037507 A1 | 2/2006 | Adams et al. | |
| 2008/0142137 A1 | 6/2008 | Scheungraber | |
| 2009/0229737 A1 | 9/2009 | Fujiwara et al. | |

FOREIGN PATENT DOCUMENTS

| | | | | |
|---|---|---|---|---|
| CN | 1311835 A | 9/2001 | | |
| DE | 1141552 B | 12/1962 | | |
| DE | 1225981 B | 9/1966 | | |
| DE | 1244003 B | 7/1967 | | |
| DE | 1912469 A1 | 9/1970 | | |
| DE | 3515944 | * 11/1986 | | B60C 15/00 |
| DE | 3926946 A1 | 1/1991 | | |
| DE | 29610697 B | 9/1996 | | |
| EP | 0025180 A2 | 3/1981 | | |
| EP | 0279901 | 8/1988 | | |
| EP | 0353313 A1 | 2/1990 | | |
| FR | 634317 A | 2/1928 | | |
| FR | 1203408 A | 1/1960 | | |
| FR | 1226595 | * 7/1960 | | B60C 9/02 |
| FR | 1287560 | * 2/1962 | | B60C 9/20 |
| GB | 839087 A | 6/1960 | | |
| GB | 1082327 A | 9/1967 | | |
| GB | 1280210 A | 7/1972 | | |
| JP | 63041209 A | 2/1988 | | |
| JP | 0216209 | 6/1990 | | |
| JP | H07-137155 A1 | 5/1995 | | |
| JP | H07-172123 A | 11/1995 | | |
| JP | 8244124 A | 9/1996 | | |
| JP | 11-010746 A | 1/1999 | | |
| JP | 2000512230 A | 9/2000 | | |
| JP | 2002-103923 A | 4/2002 | | |
| NL | 9302004 A | 6/1995 | | |
| RU | 2176954 C1 | 12/2001 | | |
| SU | 41858 A1 | 2/1935 | | |
| SU | 238143 A1 | 2/1969 | | |
| SU | 1648807 A1 | 5/1991 | | |
| SU | 1708666 A1 | 1/1992 | | |
| WO | 8504619 | 10/1985 | | |
| WO | 2006/094775 A1 | 9/2006 | | |

OTHER PUBLICATIONS

Machine-generated English language translation of DE 3515944 (original document dated 1986).*

Machine-generated English language translation of FR 1287560 (original document dated 1962).*

PCT/US2008/068597 International Search Report dated Nov. 28, 2008.

PCT/US2008/068597 International Written Opinion dated Nov. 28, 2008.

SU 41858 A1—English abstract translation obtained from McElroy Translation on Aug. 10, 2012, 1 page.

SU 238143 A1—English abstract translation obtained from McElroy Translation on Aug. 10, 2012, 1 page.

SU 1648807 A1—English machine translation obtained using Google Translate (http://translate.google.com) on Apr. 9, 2012, 3 pages.

SU 1708666 A1—English abstract translation obtained from McElroy Translation on Aug. 10, 2012, 1 page.

RU 2176954 C1—English abstract obtained from Espacenet (http://worldwide.espacenet.com) on Apr. 9, 2012, 1 page.

DE3926946A1—English machine translation obtained from European Patent Office website (http://translationportal.epo.org) on Aug. 3, 2012, 2 pages.

JP63041209A—English abstract and machine translation obtained from Espacenet (http://worldwide.espacenet.com) on Jan. 8, 2013, 23 pages.

JP2000512230A—English machine translation obtained from Patent Abstracts of Japan (http://www4.ipdl.inpit.go.jp) on Jan. 8, 2013, 4 pages.

FR634317A—English machine translation obtained from Espacenet (http://worldwide.espacenet.com) on Dec. 5, 2012, 4 pages.

FR1203408A—English machine translation obtained from Espacenet (http://worldwide.espacenet.com) on Dec. 5, 2012, 4 pages.

DE1141552B—English machine translation obtained from Google Translate Website (http://translate.google.com) on Jan. 11, 2013, 4 pages.

DE1244003B—English machine translation obtained from Espacenet (http://worldwide.espacenet.com) on Oct. 15, 2012, 4 pages.

JP-H07-137155-A—English abstract and machine translation obtained from Patent Abstract of Japan (http://www19.ipdl.inpit.go.jp) on Oct. 11, 2012, 5 pages.

NL9302004A—English abstract obtained from Espacenet (http://worldwide.espacenet.com) on Oct. 15, 2012, 1 page.

JP-H07-172123-A—English abstract and machine translation obtained from Patent Abstract of Japan (http://www19.ipdl.inpit.go.jp) on Oct. 11, 2012, 7 pages.

JP8244124A—English abstract obtained from Espacenet (http://worldwide.espacenet.com) on Jan. 8, 2013, 2 pages.

WO2006/094775A1—English abstract and machine translation obtained from Espacenet (http://worldwide.espacenet.com) on Jan. 28, 2013, 5 pages.

* cited by examiner

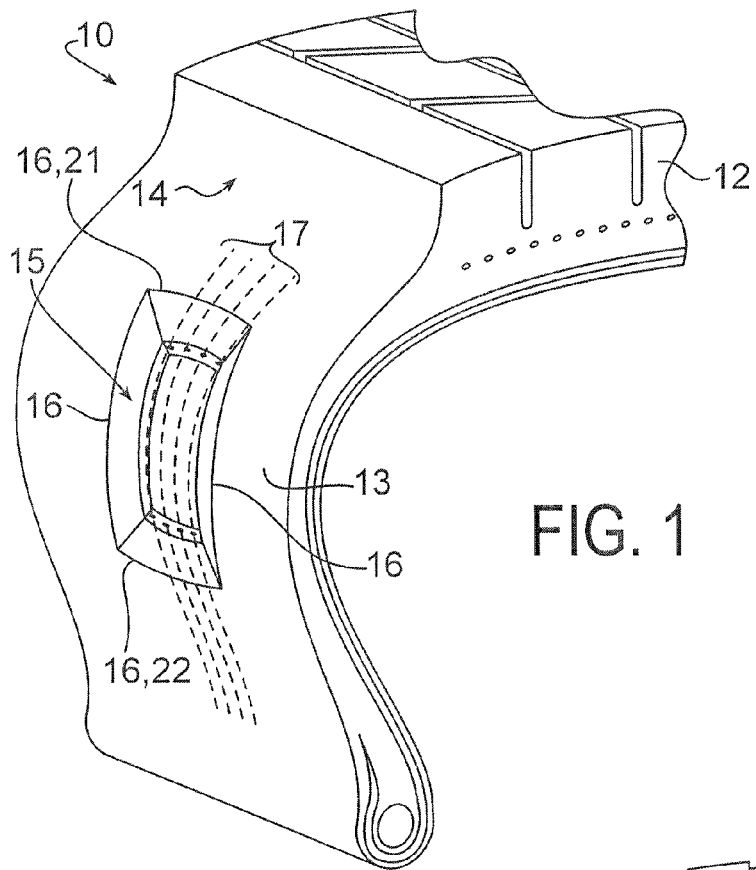
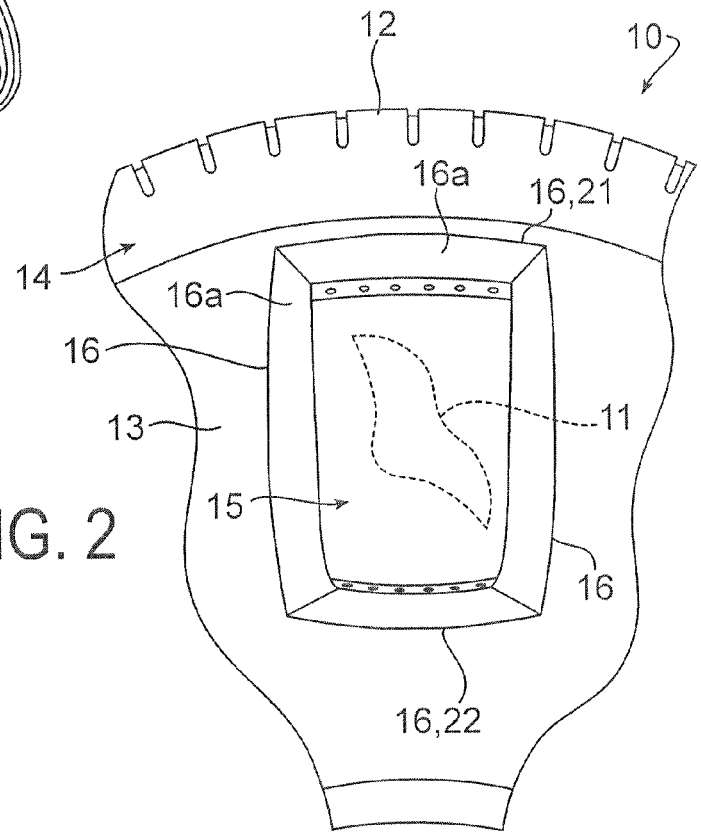

DAMAGED REINFORCEMENT ENDING PREPARATION FOR TIRE REPAIRS

This application is a National Stage application of International Application No. PCT/US2008/068597, filed Jun. 27, 2008, to which this application claims priority and the benefit of, the disclosure of which is also hereby incorporated by reference.

BACKGROUND OF THE INVENTION

1. Field of the Invention

The invention relates generally to tire repair, and, more specifically, to a method and apparatus for preparing the damaged portion of a tire to be patched.

2. Description of the Related Art

Tires are known to be susceptible to becoming damaged. Such damage may occur when a tire encounters road debris, such as nails, glass, and stone, and during tire mounting and dismounting. Damage may also form a defect in the tire. Damage may occur on the inside or outside of the tire, or may penetrate the tire, such as a puncture or laceration. Further, the damage may occur along the tread area, the sidewalls, or the shoulders, which is the area between the tread area and a sidewall. A damaged tire portion generally refers to a portion of the tire needing repair, where the need may arise for any reason.

When repairing the damaged area of a tire, a patch is commonly used to cover and seal the damaged area. A patch is generally made of polymeric or elastomeric material, such as natural or synthetic rubber. A patch may further include reinforcements extending within the patch, which may form of metallic cables or cords formed of any textile material for the purpose of partially replacing the function of any damaged tire reinforcement. Further, the patch may be adhesively affixed or cured to the tire. The damaged area may be prepared before application of the patch. For example, debris and any damaged material may be removed, the damaged portion cleaned, and/or an adhesive or cement applied to the damaged area.

SUMMARY OF THE INVENTION

Particular embodiments of the present invention include methods and apparatus for preparing an edge of a tire for repair. Particular embodiments of the present invention include methods of preparing a portion of a tire for repair, the method having steps that include forming an edge along an opening within the tire, the edge extending between an interior and an exterior surface of the tire and including one or more tire reinforcement endings, the edge being formed to include an alternating arrangement of tire reinforcement endings. Particular embodiments of the step of forming an edge may include alternating the radial location of the reinforcement endings among two or more radial positions along the edge of the opening. Particular embodiments of the step of forming an edge may include forming one or more recessed portions in said edge to form at least one extended portion extending toward said opening, wherein said recessed portions and said extended portions each include at least one reinforcement ending. Particular embodiments of the step of forming an edge may include axially displacing the reinforcement endings relative to each other.

Particular embodiments of the present invention include methods of preparing a portion of a tire for repair, the method having steps that include forming an edge within an opening of a tire, said edge extending between an interior and exterior tire surface and including one or more reinforcement endings of the tire. Other steps include applying a wrap about the edge to substantially cover the one or more tire reinforcement endings.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIG. 1 is a top perspective view of a damaged tire having an opening formed in association with a damaged portion of the tire according to an embodiment of the invention.

FIG. 2 is a side view of the opening shown in FIG. 1, wherein a damaged portion of the tire is shown in association with the opening.

DETAILED DESCRIPTION OF PARTICULAR EMBODIMENTS

Figure 3:
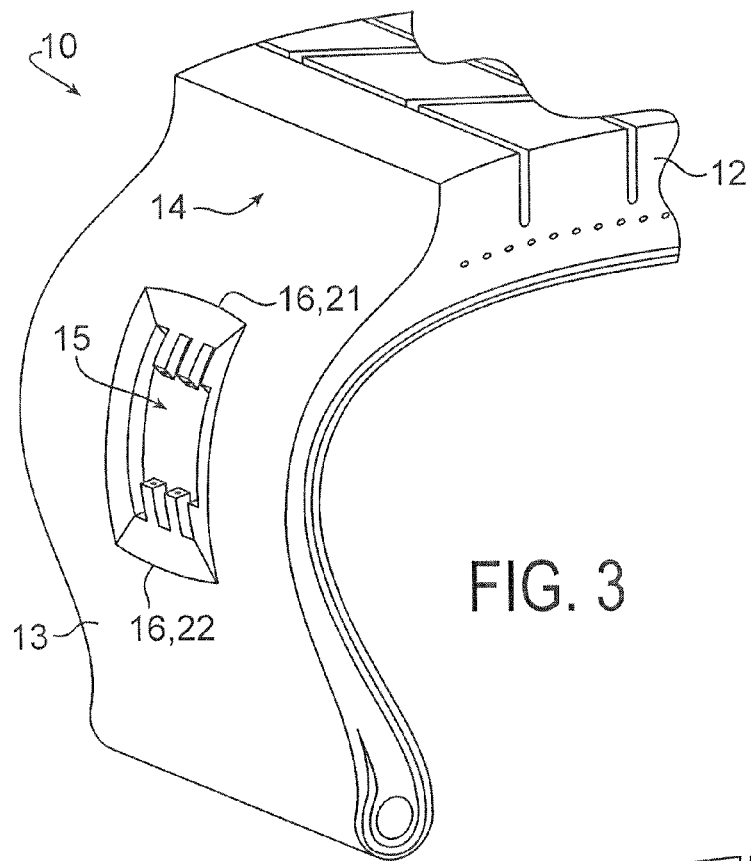
FIG. 3 is a top perspective view similar to FIG. 1 showing a staggered edge portion formed along an upper portion and a lower portion of the opening, according to an embodiment of the invention.

Particular embodiments of the present invention provide methods and apparatus for preparing a portion of a tire for repair, which may have been damaged or otherwise needs repair. Specifically, the damaged portion of the tire is prepared to facilitate repair by patching and/or filling the damaged portion.

It is known that portions of a tire may be repaired by applying patch material, such as, for example, a pre-formed patch and/or filler material, to said tire portion. In particular instances, an opening may be formed, or otherwise arise, in association with the damaged portion. The opening generally extends through a thickness of the tire, and may include one or more edges that extend about a perimeter of the opening. The one or more edges may include reinforcement endings, the endings being associated with a portion of the reinforcement that has been removed from the opening.

Repairs may fail when a separation arises at an interface between the patch material and the tire. In operation, forces are transferred between the patch material and a portion of the tire along the interface, as the tire flexes during tire operation. Often a separation will arise along an edge of the opening associated with the damaged portion, where the edge forms a stress discontinuity that can cause a localized rise in stress. Likewise, the separation may propagate along the edge during tire operation until the separation sufficiently increases to cause a failure. Separations may occur more frequently in areas of the tire experiencing deflections of larger amplitude, and/or deflections occurring more frequently. Such areas include tire sidewall and shoulder areas. Embodiments of the present invention seek to reduce the stress discontinuity located at an edge of the opening by preparing the edge before applying tire patch material.

Particular embodiments of such methods may include the step of forming an edge along an opening within the tire, the edge extending between an interior and an exterior surface of the tire and including one or more tire reinforcement endings, the edge being formed to include an alternating arrangement of tire reinforcement endings. In an effort to reduce the formation and/or propagation of any separation, in particular embodiments, the tire reinforcement endings located along an edge of an opening may extend in an alternating (or, "staggered") path, where "alternating" means a path that is non-linear and non-arcuate. For example, an alternating path may be a step function, zig-zag, sinusoidal, or any other curvilinear (non-arcuate) path, which may be characterized by a formula or pattern, or may be arbitrary. This alternating arrangement may result in an edge or edge portion that also extends in an alternating path. The alternating arrangement of endings may reduce the stress discontinuity associated with a linear, arcuate, or similar arrangement of reinforcement endings.

In particular embodiments, the step of forming an edge may include alternating the radial location of the reinforcement endings among two or more radial positions along the edge of the opening. "Radial" as used herein refers to the radial direction of a tire, that is, a direction extending between opposing tire beads, or up and between each opposing sidewall. It is contemplated, that tire reinforcements, as well as the staggering of any reinforcement ending, may extend in any direction relative to a tire, which includes extending lengthwise in a radial direction.

In particular embodiments, the step of forming an edge may include forming one or more recessed portions in said edge to form at least one extended portion extending towards said opening, wherein said recessed portions and said extended portions each include at least one reinforcement ending. Recesses are formed along an edge by removing additional material from the opening, which includes removing tire reinforcement. It is contemplated that a recess or extension may include any number of reinforcement endings. In particular embodiments, the recessed portions and the extended portions each include the same quantity of reinforcement endings. In particular embodiments, the recessed portions and the extended portions each include a single reinforcement ending. It is contemplated that each recess and extension may include a length, which may extend any desired distance. Particular embodiments also include the recessed and extended portions each having a length, wherein the lengths of all portions are substantially equal.

Particular embodiments of the step of forming an edge includes alternating the reinforcement endings by axially displacing the reinforcement endings relative to the tire. The endings positioned along an edge may be deflected individually, or as part of a group of endings, toward an interior or exterior portion of the tire to form an alternating arrangement of reinforcement endings. This arrangement reduces the stress singularity otherwise located along the edge, in a similar fashion to the embodiments discussed above. Any alternating arrangement is contemplated, as with the embodiments discussed above. In particular embodiments, the step of axially displacing the reinforcement endings includes alternately deflecting adjacent ends outward and inward relative to said tire.

In particular embodiments, such methods may also include the steps of forming an opening within the tire, the opening being associated with the damaged tire portion, and applying one or more patch materials to a portion of the tire associated with the opening. As discussed above, an opening may be formed in association with a damaged portion, for the purpose of preparing the damaged portion for repair. Patch materials may comprise any material known in the art, which includes, for example, pre-assembled patches and filler material, which generally comprises an uncured elastomer, such as natural or synthetic rubber. It is contemplated that the step of forming an edge may occur during the step of forming an opening. In particular embodiments, a wrap may be applied to an edge having an alternating arrangement of reinforcement endings. The wrap is discussed more fully below.

Particular embodiments of the method of preparing a damaged portion of a tire for repair may include the step of forming an edge within an opening of a tire, the opening being associated with a damaged portion of the tire, said edge extending between an interior and exterior tire surface and including one or more reinforcement endings of the tire. In particular embodiments, this edge may be shaped to provide a taper extending inward the opening. In particular embodiments, this taper may be formed during the edge forming process, such as by a skiving process or any other process for removing tire material. The taper may also form a chamfer. Further, in particular embodiments, the taper may extend from the exterior of the tire toward the inside of the tire. The damaged area of the tire may be partially or fully removed.

Such method also includes applying a reinforced wrap about the edge containing one or more tire reinforcement endings, the wrap extending from an interior surface to a position along the edge such that the one or more tire reinforcement endings are covered by the wrap. The wrap contains a plurality of wrap reinforcements. The method of applying a wrap to an edge is another method of reducing the formation and propagation of separations and cracks along an edge by isolating the reinforcement endings, and the forces emanating there from, from the surrounding patch material, which may otherwise generate separations between the endings and the patch material. The wrap may be formed by a plurality of wrap reinforcements, which may be formed of any metal or textile material capable of bending about an edge. In particular embodiments, wrap reinforcements may be selected from the group consisting of nylon, aramid, polyester, and rayon. The wrap reinforcements may extend in any direction, including a lengthwise direction between opposing ends of the wrap. The lengthwise direction may be shorter than a width of the patch. Particular embodiments of such methods may provide a wrap having a plurality of parallel wrap reinforcements extending lengthwise between the first and second ends of the patch material. The plurality of wrap reinforcements may form a wrap reinforcement layer. It is contemplated that one or more wrap layers may be provided in the wrap. It is also contemplated that the wrap reinforcements may be arranged in a woven arrangement, where a first quantity of reinforcements is woven between a second quantity of reinforcements. In particular embodiments, a square-woven configuration of reinforcements may be provided.

The wrap generally extends from an interior tire surface to at least a portion of an edge associated with a tire portion to be repaired. The wrap generally includes a pair of opposing ends, each of which extend a desired distance along one the interior or exterior portions of the tire. Particular embodiments of the step of applying the wrap may include applying a first end of the wrap at least 5 mm from the edge along the interior surface of the tire, and applying a second end of the wrap at least 5 millimeters (mm) beyond the ends of the tire reinforcement endings (i.e., on the exterior tire side of the tire reinforcement endings). In other embodiments, each of the first and second ends may be applied at different distances from a corresponding edge. Accordingly, particular embodiments of the step of applying the wrap may include applying a first end of the wrap at least 10 mm from the edge along the interior surface of the tire, and applying a second end of the wrap at least 5 millimeters (mm) beyond the ends of the tire reinforcement endings (i.e., on the exterior tire side of the tire reinforcement endings). The wrap may be applied to an edge in any manner to arrange wrap reinforcements in any relation to the edge. Particular embodiments of the step of applying may include orienting a length of the plurality of wrap reinforcements substantially parallel to a central radial axis of the opening.

The wrap is generally secured to a surface of the tire. Particular embodiments of the step of applying a wrap may include placing an adhesive between the wrap and each of the interior and exterior surfaces of the tire to which the wrap is applied. In particular embodiments, the adhesive forms a portion of the wrap and includes uncured elastomer.

After application of any wrap to an edge, the damaged portion may continue to be prepared for repair, in particular embodiments, by applying one or more patch materials to a portion of the tire associated with the opening. Patch materials may include any material known in the art to be used for filling and/or covering a damaged area of a tire. For example, patching material includes pre-assembled or unitary patches, unassembled patches, or filler material. Particular embodiments include applying the patch to the interior tire surface to substantially cover portions of each wrap extending along the interior surface of the tire.

The methods generally described above, and the manner in which they are employed or practiced, are now discussed in further detail below with reference to various exemplary embodiments.

With general reference to the embodiment shown in FIGS. 1 and 2, a tire 10 may include an opening 15, which may be associated with a damaged portion 11. Opening 15 is generally an opening prepared and formed by removing portions of the tire associated, which may include removing at least a portion of the damaged portion; although it is conceivable that the opening may be formed as the tire was damaged. The damaged portion 11, shown schematically in FIG. 2, may comprise, for example, a crack, puncture, laceration, abrasion, cavity, or other defect that compromises tire 10. Opening 15 may comprise any size and shape suitable for encompassing the damaged portion 11. For example, opening 15 may comprise an irregular or arbitrary shape, or a geometrical shape, such as, a polygon, circle, or ellipse, each of which may include one or more rounded sides or ends. Opening 15 may also be formed in any portion of the tire 10, such as the sidewall 13 as shown in the FIGURES, or in the tread 12 or shoulder 14 portions. Formation of opening 15 may include removing portions of tire reinforcements 17, as well as other portions of tire 10, associated with the damaged portion 11. Such portions may be removed by cutting, burning, grinding, or any other known method.

Opening 15 generally includes one or more edges 16 extending along a perimeter of opening 15. One or more edges 16 may be shaped to provide a taper 16a extending inward the opening. In particular embodiments, this taper 16a may be formed during the edge forming process, such as by a skiving process or any other process for removing tire material. In specific embodiments, taper 16a may form a chamfer. In various embodiments, taper 16a may extend from the exterior of the tire toward the inside of the tire. One or more edges 16 may include endings 20 of reinforcements 17. In the embodiments shown, reinforcement endings 20 exist along edges 21, 22, which are located along upper and lower portions of opening 15. Tire reinforcements 17 may comprise cords or cables formed of: metals, such as steel; textiles or polymers, such as nylon, aramid, polyester, or rayon; or any other material known in the art. Reinforcements 17 generally extend in a radial direction of tire 10 (that is, reinforcements 17 extend lengthwise between the tire sidewalls 13 (or tire beads)). Still, it is contemplated that reinforcements may extend in any direction relative to tire 10.

In particular embodiments, the reinforcement endings 20 along one or more edges 16 of opening 15 may be prepared for repair by arranging tire reinforcement endings 20 in an alternating arrangement. This alternating arrangement may reduce the stress discontinuity associated with an edge 16 of opening 15. An alternating arrangement of reinforcement endings 20 may be formed by varying the location of endings 20 along an edge 16, such that a non-linear or non-arcuate arrangement of endings 20 is achieved. In the particular embodiments shown in FIGS. 3-6, the endings 20 radially extending reinforcements 17 are arranged in an alternating arrangement by radially staggering endings 20 along edges 21, 22. In other words, the lengthwise endings 20 of reinforcements 17 are positioned along an edge 16 in a non-linear, non-arcuate arrangement, where at least two pairs of adjacent endings 20a, 20b alternate between inward and outward positions relative the opening. The two alternations between inward and outward positions, generally represented by $\Delta_R$, may be spaced apart by intervening reinforcement endings 20, or may be positioned adjacently as shown in the FIGURES. Also, each of the two pairs may share a common reinforcement ending, such as is shown by example in FIG. 6. An alternating arrangement of endings 20 may form an alternating edge 16. In the embodiments shown in FIGS. 3-6, alternating reinforcement endings 20 provide alternating edges 21, 22 that extend in an alternating path along sidewall 13. An alternating edge 16 may include recesses 24 and extensions 26, each of which may or may not include one or more reinforcement endings 20.

Figure 4:
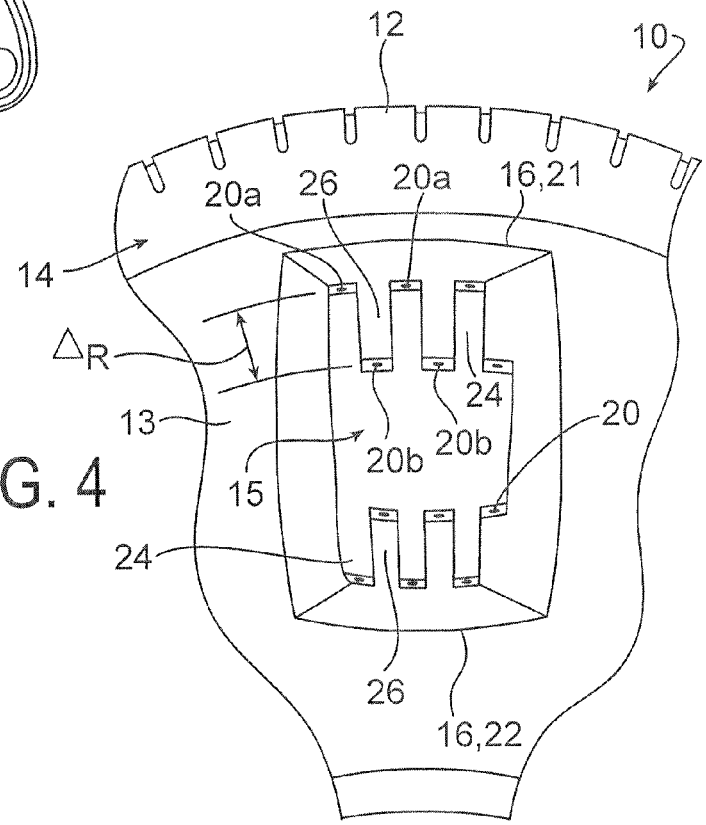
FIG. 4 is a side view of the embodiment shown in FIG. 3.
Figure 5:
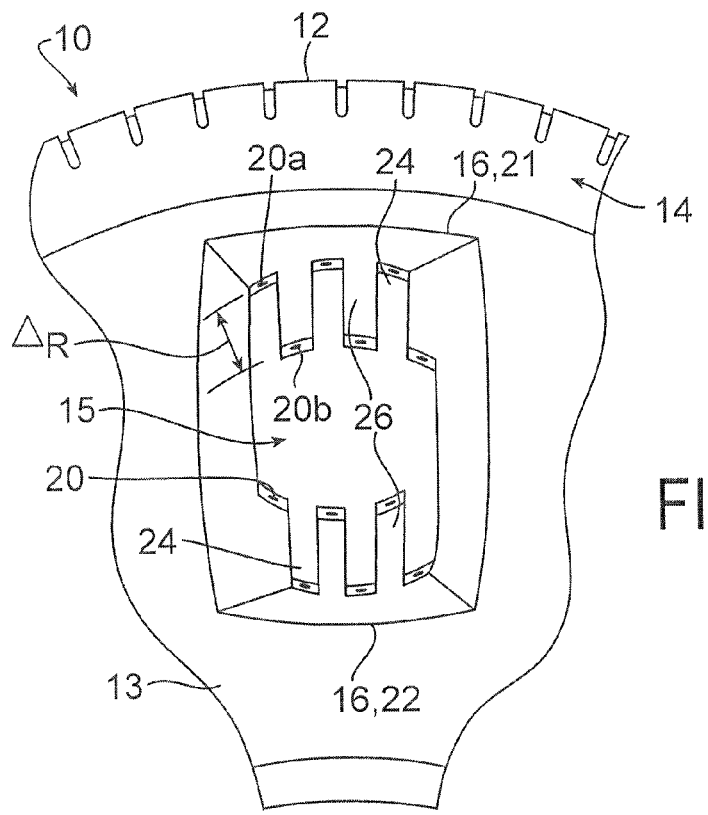
FIG. 5 is a side view similar to FIG. 4 showing an opening having staggered edge portions formed at upper and lower portions of the opening, where each staggered edge portion generally tracks a curved path, according to an embodiment of the invention.
Figure 6:
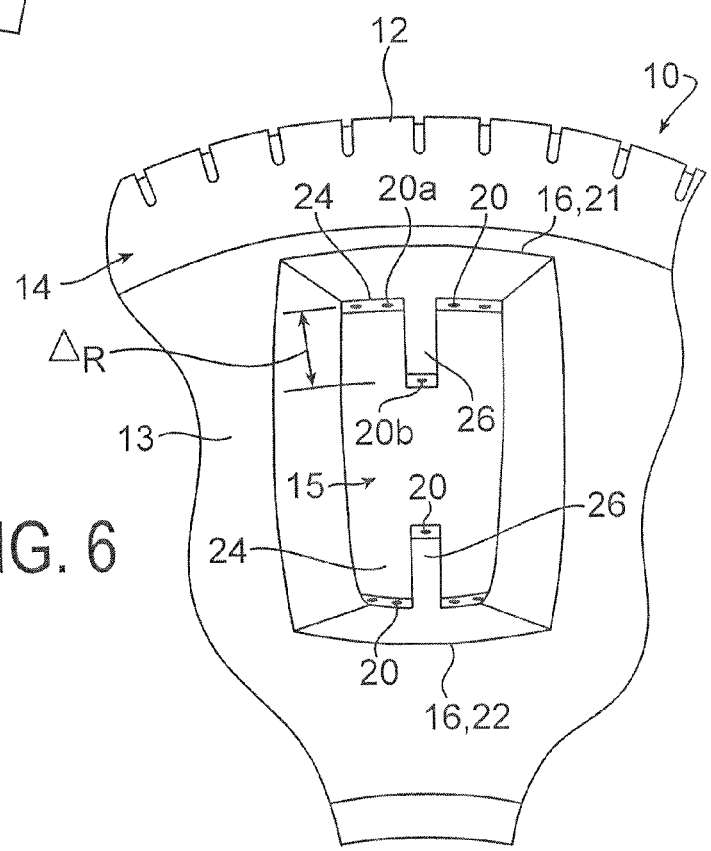
FIG. 6 is a side view similar to FIG. 4 showing staggered edge portions formed at upper and lower portions of the opening, each staggered edge portion having a recessed section including two reinforcement endings and a protruding section including one reinforcement ending.

By way of example, in the particular embodiments shown in FIGS. 3-5, each recess and each extension may have one (1) reinforcement ending 20 to form a 1×1 arrangement (i.e., a recess 24, having one (1) ending 20, that is adjacent to an extension having one (1) ending 20). In the embodiment shown in FIG. 6, each recess has two (2) reinforcement endings and each extension has one (1) reinforcement ending 20 to form a 2×1 arrangement. Other exemplary arrangements of endings 20 include, for example, 1×2, 2×2, and 3×3 arrangements. It is also contemplated that two or more offsets $\Delta_r$ may exist. For example, a 1×1×1 arrangement may exist, where the first ending 20 is located in a recess defined by offset $\Delta r_1$ relative to the corresponding extension, a second ending 20 located in a recess defined by offset $\Delta_{r2}$ relative to the corresponding extension, where $\Delta_{r1}$ is greater than $\Delta_{r2}$. It is also contemplated that when an opening 15 includes opposing edges 16 having an alternating arrangement of endings 20, such as edges 21, 22, the arrangements may be generally symmetric about a longitudinal central axis of the opening, such as is shown in FIGS. 4 and 6, or asymmetric, such as is shown in FIG. 5.

An alternating edge 16 having an alternating arrangement of reinforcement endings 20 generally comprises a non-linearly extending edge path, or a path that is not arcuate. Accordingly, an alternating edge includes any other non-linear or non-arcuate arrangement, such as, for example, a step function, zig-zag, sinusoidal, or any other curvilinear (non-arcuate) paths, which may be characterized by a formula or pattern or may be arbitrary. Such alternating paths may also be formed about an edge that more generally extends linearly or arcuately. For example, as shown in FIG. 6, each alternating edge extends in a path represented by a step-function, but the function (or the edge more generally) extends from left to right in a linear or slightly arcuate path. In the embodiment shown in FIGS. 3 and 4, alternating edges 21, 22 extend more specifically in a stepped path, but more generally in a slightly arced path. In the embodiment shown in FIG. 5, the stepped paths of edges 21, 22 generally extend in a more noticeable arcuate path.

Figure 7:
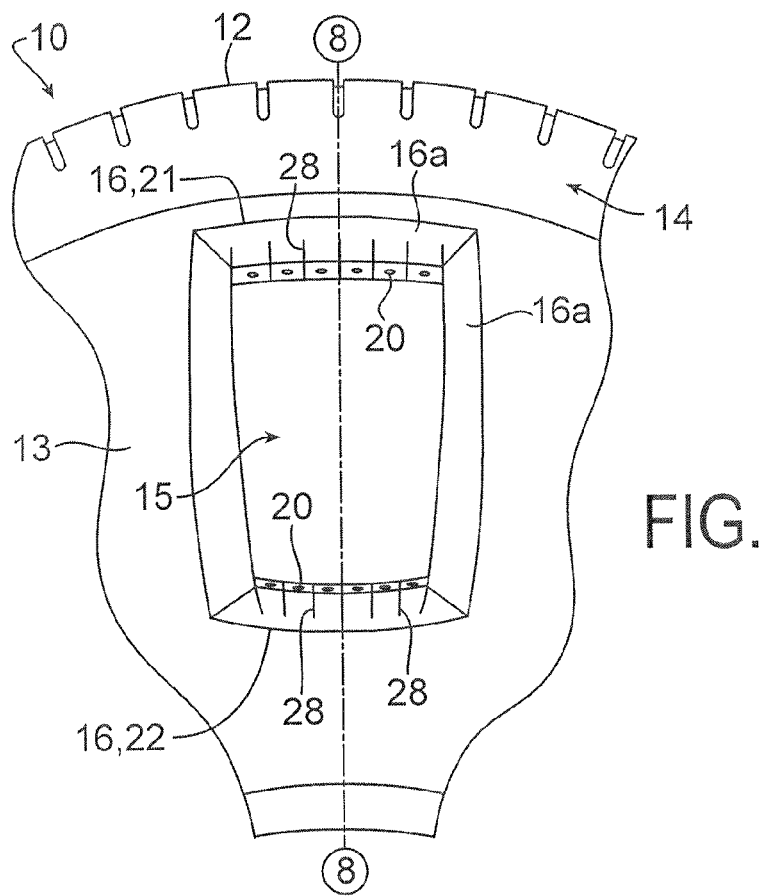
FIG. 7 is a side view similar to FIG. 4 showing staggered edge portions formed by alternately deflecting exposed reinforcement endings in the axial direction relative to each other.
Figure 8:
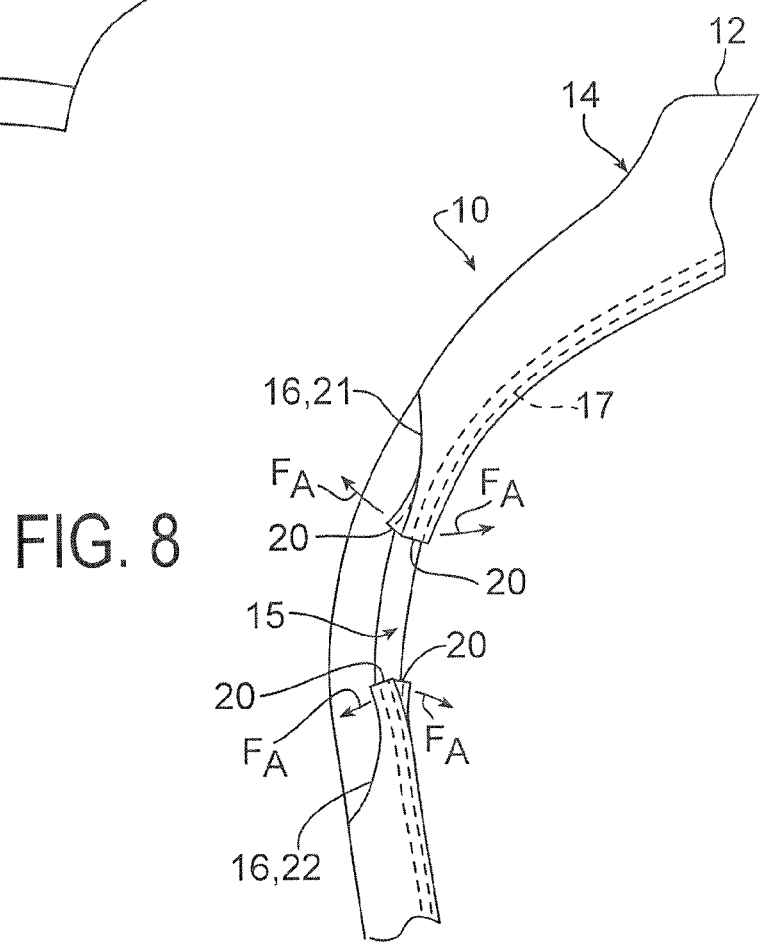
FIG. 8 is a sectional view taken along line 8-8 of the embodiment shown in FIG. 7.
Figure 9:
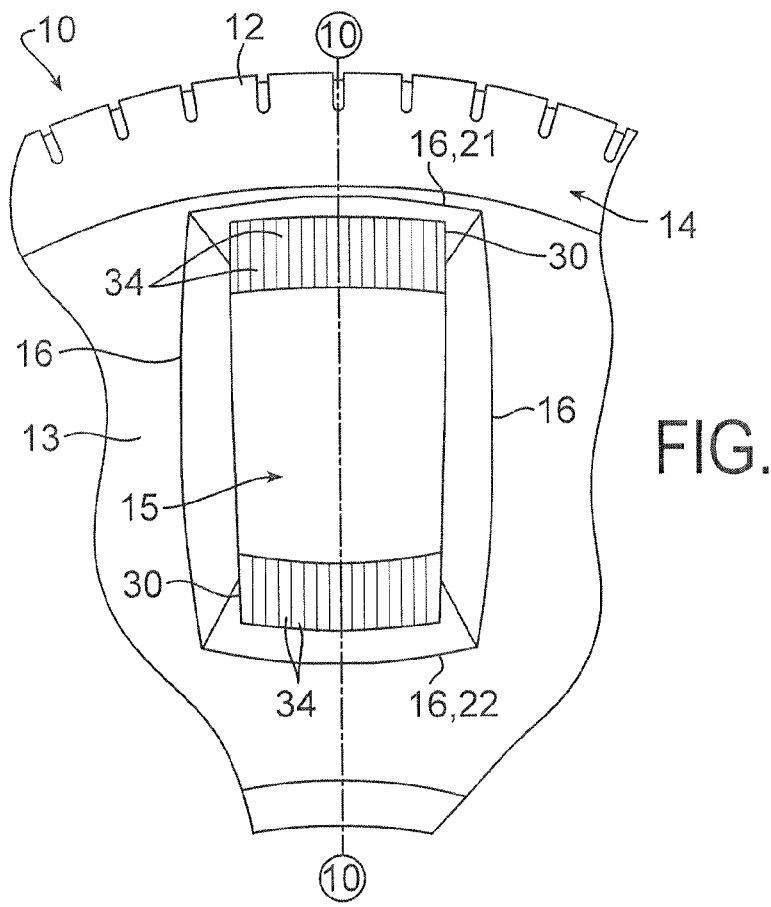
FIG. 9 is a side view according to another embodiment of the present invention, wherein a wrap has been applied at each of the upper and lower edges portions of the opening shown in FIG. 1.

FIGS. 7 and 8 depict an embodiment of edges 21, 22 having an alternating arrangement of endings 20, where the endings are axially deflected. Accordingly, each edge 21, 22 extends in an alternating path. When forming an axial alternating arrangement of endings 20, endings 20 and adjacent portions corresponding reinforcements 17, are deflected or bent toward either the interior or exterior of the tire—which is in a generally axial direction of the tire 10. The axially alternating path reduces the formation of a single discontinuity along any associated edge 16. As in the previously described embodiments, the axially alternating arrangement may comprise any arrangement of alternating endings as previously discussed in other radially alternating embodiments. For example, the arrangement of alternating endings may include a 1×1 pattern, as shown in FIG. 8. Further, the edge may extend in a more specific non-linear or non-arcuate path as previously discussed in the radially alternating embodiments above. One or more endings 20 are generally axially deflected in the direction of $F_A$, the deflection comprising any distance from the path through which the reinforcement extends through tire 10. Ends 20 may deflected individually, or as a group, in a particular direction. The deflection of the ends may be accomplished by bending the ends by hand, tool, machine, or by allowing any patch filler material to deflect the ends in as desired when depositing the filler material into opening 15. It is contemplated that any other method known in the art may be used to deflect reinforcement endings 20. As shown in FIG. 7, slits 28 may be made between reinforcement endings as desired to achieve bending and deflection of endings 20 in a desired arrangement.

In another particular embodiment of the methods, shown in FIGS. 9-12, a wrap 30 is applied about an edge 16 that contains reinforcement endings 20. Wrap 30 is applied to isolate endings 20 from any patch material applied to opening 15, for the purpose of reducing the creation and propagation of any separation and/or cracks that may arise due to the interaction between endings 20 and the patch material. Wraps 30 generally extend about an associated edge to substantially cover the one or more tire reinforcement endings contained in the edge. In particular embodiments, a wrap 30 extends from an interior surface of the tire to a portion of the edge. In the embodiment shown in FIG. 9, wraps 30 are placed about edges 21, 22 located along top and bottom portions of opening 15.

Wrap 30 includes a plurality of reinforcements 34. Reinforcements 34 are generally bendable, so to allow the reinforcements 34 to extend about an edge 16 between the interior and exterior of tire 10. Reinforcements 34 may comprise any material known in the art, such as, for example, such as, for example, nylon, polyester, aramid, rayon, and other textile or polymeric materials. In particular embodiments, reinforcements 34 are formed from nylon 840/1 or 840/2 material. Reinforcement 34 may also include a coating of any elastomer known in the art, such as, for example, any natural or synthetic rubber or polymer. Reinforcements 34 may form a reinforcement layer 37 and may comprise a ply or sheet of reinforcements 34. It is contemplated that one or more wrap layers 37 may be provided in wrap 30. It is also contemplated that the wrap reinforcements 34 may be arranged in a woven arrangement, where a first quantity of reinforcements 34 is woven between a second quantity of reinforcements 34. In particular embodiments, a square-woven configuration of reinforcements 34 may be provided.

Wrap reinforcements 34 may be arranged in any manner including uniform and non-uniform arrangements. In the particular embodiment shown in FIG. 9, reinforcements 34 extend lengthwise between ends 31, 32 and are arranged in a parallel array. Wrap reinforcements 34 may extend in any direction relative to a lengthwise direction of wrap 30, or relative to edge 16 or tire 10 when wrap 30 is applied to tire 10. In the embodiment shown in FIG. 9, the reinforcements 34 generally extend in a lengthwise direction of the wrap 30. In the same embodiment, the reinforcements 34 of each applied wrap 30 extend in a generally radial direction of tire 10 or normal to the corresponding edge 21, 22 (i.e., the reinforcements extend generally parallel to a radial centerline of opening 15, which extends along line 10-10 in FIG. 9).

The wrap 30 may be formed of one or more layers of material, including one or more layers 37 of reinforcement 34, and applied to the tire in any suitable fashion, including the use of adhesive, uncured rubber, or other means known in the art. In particular embodiments, wrap 30 may include one or more layers of adhesive or cushion rubber, which is generally represented by inner layer 36 in FIGS. 11-12. It will be understood that such adhesive, uncured rubber, or other means may be pre-applied to the wrap 30 as a layer, or may be applied to tire 10 prior application of wrap 30. The adhesive may comprise any known adhesive, which, for example, may include an uncured elastomer, such as natural or synthetic rubber or a gelatin, epoxy, resin, or polyethylene based adhesive. It is contemplated that wrap 30 may have any thickness $T_W$, and in one embodiment, $T_W$ is between 0.5 and 2 mm. In particular embodiments, $T_W$ is between 0.8 and 1.3 mm. In particular embodiments, inner layer 36 is between 0.25 and 0.5 mm thick.

Figure 10:
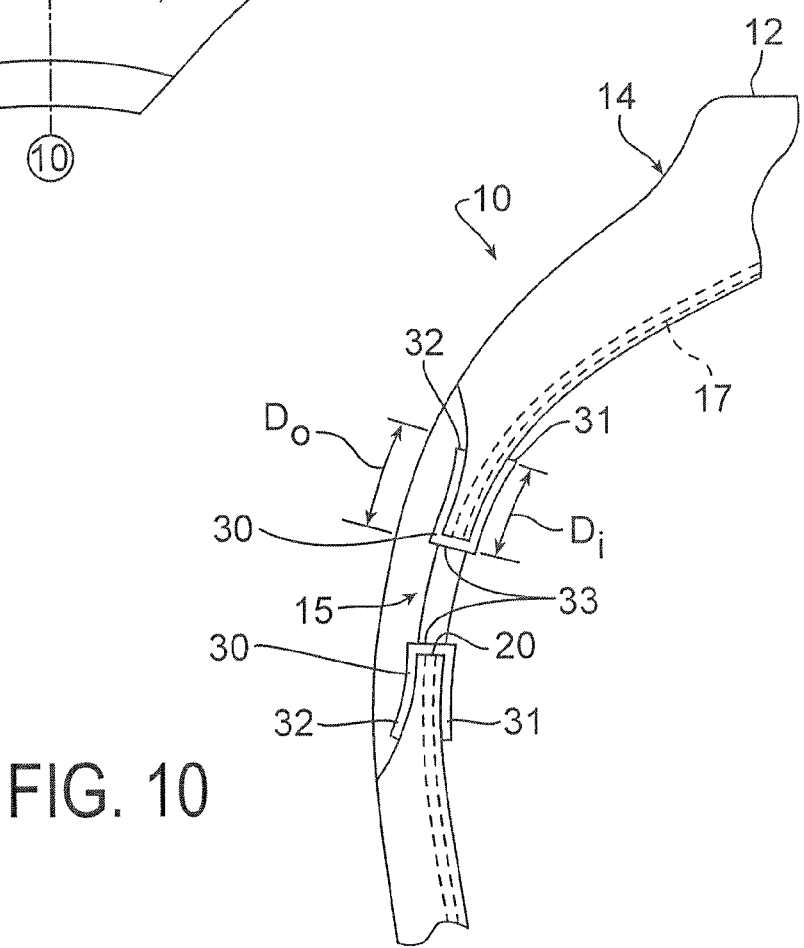
FIG. 10 is a sectional view taken along line 10-10 of the embodiment shown in FIG. 9.
Figure 11:
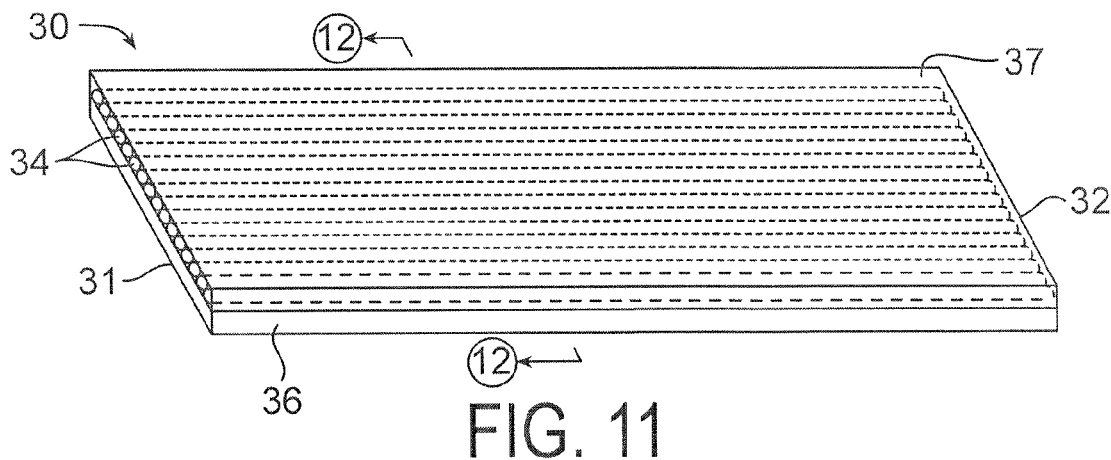
FIG. 11 is a top perspective view of a wrap according to a particular embodiment of the present invention.
Figure 12:
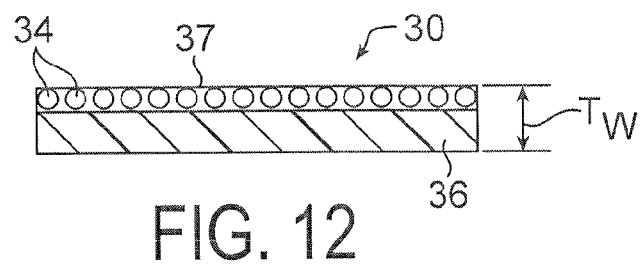
FIG. 12 is a sectioned view taken along line 12-12 of the embodiment shown in FIG. 11.

With reference to FIG. 10, in one embodiment, wrap 30 may attach to tire 10 by applying a first or inner end 31 to an interior surface of tire 10, and a second or outer end 32 to at least a portion of the wrapped edge 16. A medial portion 33 lies between the first and second ends 31, 32 of wrap, and extends about a corresponding edge 21, 22 of opening 15. In the particular embodiment shown in FIG. 10, wrap 30 extends a distance $D_i$ along the interior of tire 10 to wrap end 31, while wrap 30 extends a distance $D_o$ along the edge 16 to wrap end 32. In the embodiment shown in FIG. 10, $D_i$ and $D_o$ are approximately the same distance; however, $D_i$ and $D_o$ may each form any distance, and therefore, endings 31, 32 may be positioned in a staggered position where either distance $D_i$, $D_o$ is greater than the other. Distances $D_i$, $D_o$, in one embodiment, are at least 10 millimeters (mm) long. In another embodiment, distances $D_i$, $D_o$ are between 10 and 15 mm long.

After preparing any edge 16 for repair by creating an alternating arrangement of reinforcement endings 20 or by applying a wrap 30 there about, according to the embodiments discussed above, patch material is applied to opening 15 according to known methods to facilitate repair of the damaged tire portion. Patch material may include a pre-assembled patch having reinforcements (a "patch") 40, filler material 42, or any other material known and used within the art to cover and/or fill opening 15. In particular embodiments, a patch 40 is applied to one or more interior surfaces of tire 10 (which may include a portion of a wrap 30) to cover or bridge opening 15. More specifically, patch 40 extends beyond any edge 16 or wrap end 31 by a distance $\Delta_P$. An interior surface surrounding opening 15 may be buffed prior to patch application to remove any mold lube or other contaminants that may affect patch adhesion. Patch 40 may comprise any patch known to one in the art. Filler material 42 is generally applied to opening 15, and in particular embodiments, to any edges 16, to fill the cavity formed by opening 15 and patch 40. Filler material 42 may be applied by any known method, such as, for example, by a hot extruder. Filler 42 covers edges 16 and any wrap 30 contained within opening 15. More specifically, filler 42 may extends beyond an edge 16 or wrap end 32 by a distance $\Delta_F$, which may form any desired distance. In particular embodiments, filler distance $\Delta_F$ may comprise a distance of at least 5 mm. In the particular embodiments, thickness $T_F$ is at least 2 mm, and in other embodiments, is between 2 and 3 mm. Once the patching materials have been applied to tire 10 to fill and/or cover opening 15, the patching materials are cured by spot curing, by placing the tire in an autoclave, or by any other means known in the art.

Figure 13:
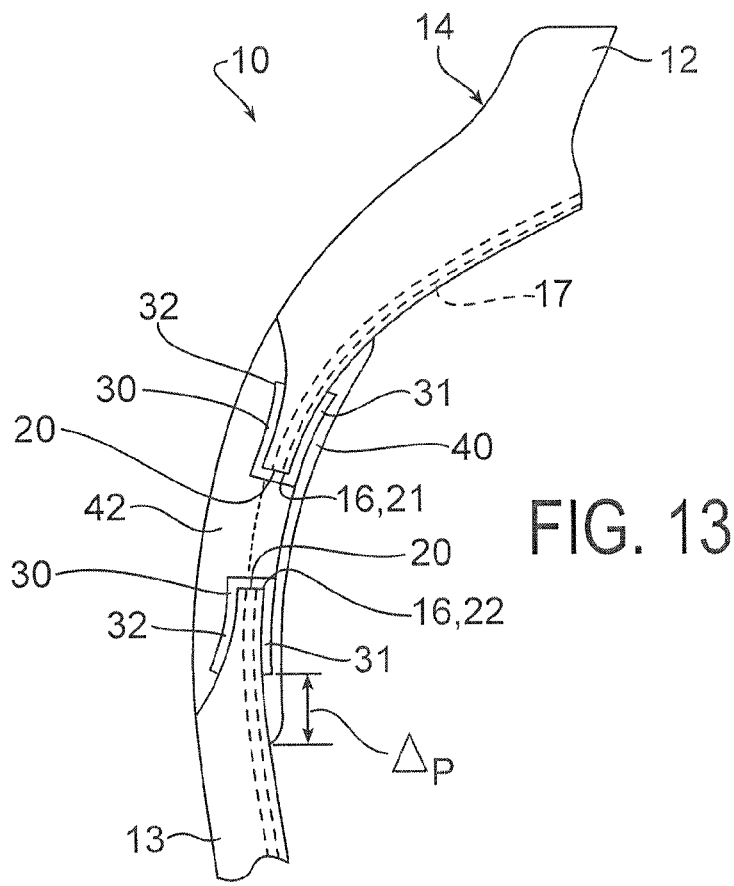
FIG. 13 is a sectioned view of a tire having a damaged portion prepared according to a particular embodiment of the present invention, wherein an opening has been formed in association with a damaged portion and the upper and lower edge portions formed to include a staggered arrangement of reinforcement endings, such a shown in the embodiments of FIGS. 3-6, a wrap applied to each of the upper and lower edge portions of the opening, a patch applied to an interior surface of the tire over the wraps, and a filler provided within the opening.
Figure 14:
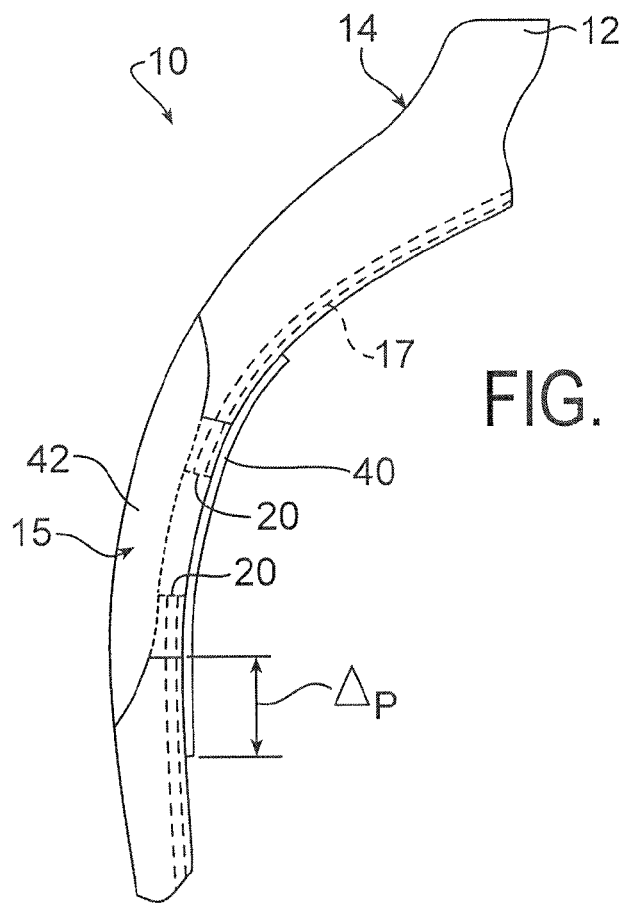
FIG. 14 is sectioned view similar to FIG. 13 showing a tire having a damaged portion prepared according to another embodiment of the present invention, where a radially staggered edge portion has been formed at upper and lower portions of the opening, such as shown in the embodiments of FIGS. 3-6, a patch applied to the interior surface of the tire, and filler provided in the opening between the edges and extending over the outer surface of the tire.
Figure 15:
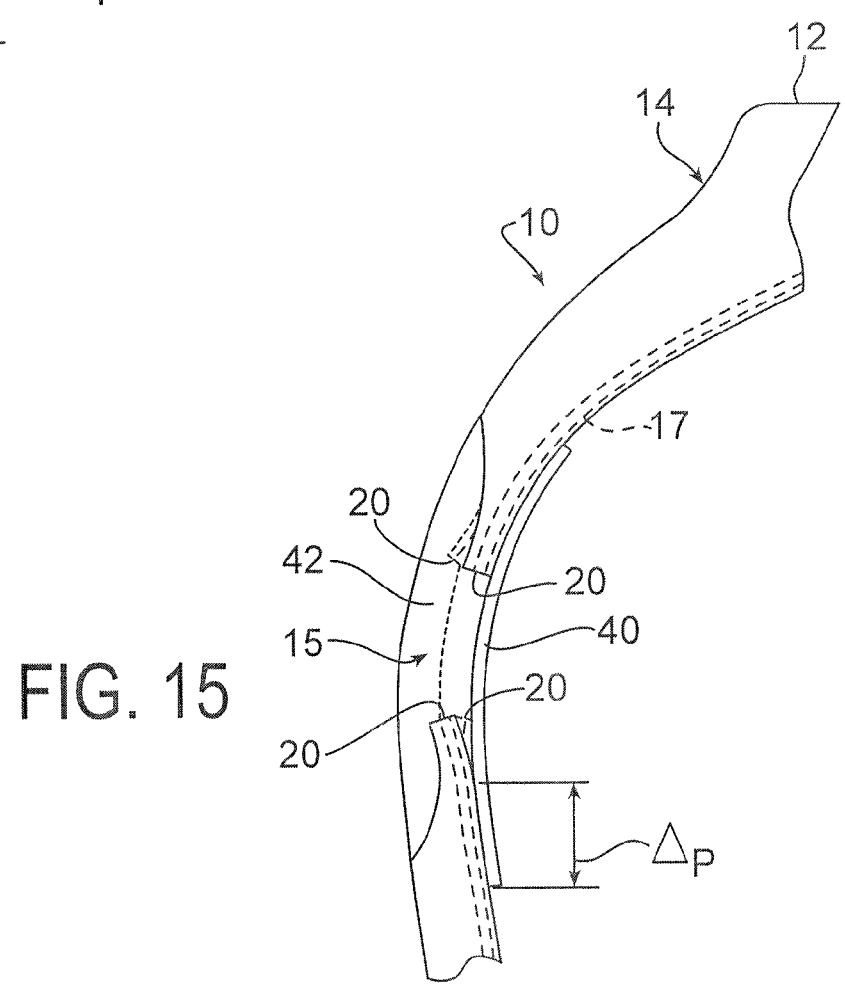
FIG. 15 is sectioned view similar to FIG. 13 showing a tire having a damaged portion prepared according to another embodiment of the present invention, where an axially staggered edge portion has been formed at upper and lower portions of the opening as shown in FIGS. 7-8, a patch applied to the interior surface of the tire, and filler provided in the opening between the edges and extending over the outer surface of the tire.

FIGS. 13-15 show the application of patch materials to tire 10 in accordance with particular embodiments of the invention. With reference to FIG. 13, patch 40 is applied to cover the opening 15, where a wrap 30 has been applied edges 21, 22. FIG. 14 shows the application of patch material to an opening 15 having edges 16 prepared to include radially alternating tire reinforcement endings 20. FIG. 15 shows the application of patch material to an opening 15 having edges 16 prepared to include axially alternating tire reinforcement endings 20.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A method of preparing a portion of a tire for repair, the tire having an exterior side and an interior side, the method comprising the step of:
    forming an opening in the tire extending from the exterior side to the interior side, the opening having a thickness and opposing sides arranged along a perimeter of the opening, each opposing side including an extended portion extending into the opening to define two recessed portions such that each extended portion is arranged between its defined two recessed portions at each opposing side along the perimeter, each extended portion extending into the opening and having the thickness,
    each opposing side having a plurality of tire reinforcement endings arranged along the perimeter of the opening, wherein the extended portions and the recessed portions each include at least one reinforcement ending from the reinforcement endings of their respective opposing sides,
    wherein each extended portion and its defined two recessed portions form an alternating arrangement of reinforcement endings along each opposing side in a direction of the lengths of the tire reinforcements, all of the reinforcement endings being located on the perimeter of the opening at the same distance from the interior side with respect to the thickness direction of the opening.

2. The method of claim 1 further comprising the steps of:
    applying one or more patch materials to the portion of the tire for repair.

3. The method of claim 1, further comprising shaping the recesses by removing material from the tire corresponding to the positions of the recesses.

4. The method of claim 1, wherein the step of forming each opposing side includes alternating the plurality of reinforcement endings arranged along each opposing side in the radial direction of the tire.

5. The method of claim 2, wherein the step of applying one or more patch materials includes applying a patch to the inside surface of the tire and applying filler material to the opening such that the filler material is present from the exterior of the tire to the patch.

6. The method of claim 1 further comprising the step of:
    applying a respective reinforced wrap to each of the opposing sides of the opening to substantially cover each opposing side.

7. The method of claim 1, further comprising the step of:
    shaping an edge around the opening to provide a taper extending inward toward the opening.

8. The method of claim 6, further comprising the step of:
    applying one or more patch materials to the portion of the tire being repaired
    wherein the step of applying the one or more patch materials includes covering an end of each wrap positioned at the exterior side.

9. The method of claim 6, wherein the step of applying each reinforced wrap includes extending each each wrap from the interior side to the exterior side, wherein each wrap is in contact with an interior face and an exterior face of the tire.

10. The method of claim 6, wherein each wrap includes a first end, the step of applying each wrap including extending each first end at least 10 mm from its opposing side along the interior surface of the tire, and wherein each wrap includes a second end, the step of applying each wrap also including extending its second end at least 5 mm beyond the plurality of tire reinforcement endings of its opposing side in a direction toward the exterior surface of the tire.

11. The method of claim 6, wherein each wrap possesses longitudinal ends and each wrap also possesses a respective plurality of parallel wrap reinforcements extending between its longitudinal ends.

12. The method of claim 11, wherein the step of applying each wrap includes orienting its plurality of wrap reinforcements substantially parallel to a central radial axis of the opening.

13. The method of claim 6, wherein the step of applying each wrap includes placing an adhesive between each wrap and each of the interior and exterior surfaces of the tire.

14. The method of claim 13, wherein the adhesive is arranged along each wrap prior to the step of applying each wrap and includes uncured elastomer.

15. The method of claim 1, wherein each alternating arrangement of reinforcement endings follows a respective path in the form of a step-function, a sinusoidal shape, a curvilinear shape, or a zig-zag.

16. The method of claim 3, wherein the removed material includes portions of the tire reinforcements.

* * * * *